(12) United States Patent
Choi

(10) Patent No.: US 11,088,551 B2
(45) Date of Patent: Aug. 10, 2021

(54) POWER SUPPLY AND BATTERY PACK INCLUDING SAME

(71) Applicant: Samsung SDI Co., Ltd., Yongin-si (KR)

(72) Inventor: Sunho Choi, Yongin-si (KR)

(73) Assignee: Samsung SDI Co., Ltd., Gyeonggi-do (KR)

( * ) Notice: Subject to any disclaimer, the term of this patent is extended or adjusted under 35 U.S.C. 154(b) by 0 days.

(21) Appl. No.: 16/532,153

(22) Filed: Aug. 5, 2019

(65) Prior Publication Data

US 2019/0363552 A1 Nov. 28, 2019

Related U.S. Application Data

(63) Continuation of application No. PCT/KR2017/014925, filed on Dec. 18, 2017.

(30) Foreign Application Priority Data

Feb. 8, 2017 (KR) ........................ 10-2017-0017647

(51) Int. Cl.
*H02J 7/00* (2006.01)
*H01M 10/42* (2006.01)
(Continued)

(52) U.S. Cl.
CPC ......... *H02J 7/0026* (2013.01); *H01M 10/425* (2013.01); *H01M 10/441* (2013.01);
(Continued)

(58) Field of Classification Search
CPC .................................................. H02J 2207/10
See application file for complete search history.

(56) References Cited

U.S. PATENT DOCUMENTS

| 6,014,300 A | 1/2000 | Yamashita |
| 8,952,664 B2 | 2/2015 | Lee et al. |

(Continued)

FOREIGN PATENT DOCUMENTS

| CN | 101295922 A | 10/2008 |
| CN | 102655346 A | 9/2012 |

(Continued)

OTHER PUBLICATIONS

International Search Report and Written Opinion of the International Searching Authority dated Mar. 28, 2018 for International Patent Application No. PCT/KR2017/014925 filed Dec. 18, 2017, of which subject U.S. Appl. No. 16/532,153 is a Continuation, each of which claims priority from Korean Patent Application No. KR 10-2017-0017647 filed Feb. 8, 2017.

(Continued)

*Primary Examiner* — Robert Grant
*Assistant Examiner* — Tynese V McDaniel
(74) *Attorney, Agent, or Firm* — Knobbe, Martens, Olson & Bear, LLP

(57) ABSTRACT

The described technology relates to a power supply and a battery pack including the same. In one embodiments, the power supply includes an input terminal configured to receive input power, a regulator configured to reduce a voltage of the input power, and a sensing circuit configured to sense an output voltage of the regulator. The power supply also includes a reference voltage controller configured to receive the input power as driving power and to feedback-control the output voltage of the regulator to correspond to a preset reference voltage, based on the sensed output voltage. The power supply further includes a switch arranged between the input terminal and the reference voltage controller and configured to control the driving power applied to the reference voltage controller.

16 Claims, 4 Drawing Sheets

(51) Int. Cl.
*H01M 10/44* (2006.01)
*G05F 1/575* (2006.01)

(52) U.S. Cl.
CPC ............ *H02J 7/0072* (2013.01); *G05F 1/575* (2013.01); *H01M 2010/4271* (2013.01)

(56) References Cited

U.S. PATENT DOCUMENTS

| | | | |
|---|---|---|---|
| 9,214,808 B2 * | 12/2015 | Tang | G06F 1/26 |
| 9,610,846 B2 | 4/2017 | Yoon | |
| 10,086,711 B2 | 10/2018 | Kawamura | |
| 2001/0028571 A1 | 10/2001 | Hanada et al. | |
| 2009/0161394 A1 * | 6/2009 | Hung | G06F 1/26 |
| | | | 363/65 |
| 2011/0156483 A1 * | 6/2011 | Caraghiorghiopol | |
| | | | H02J 7/0068 |
| | | | 307/66 |
| 2011/0267726 A1 * | 11/2011 | Ikeuchi | H01M 10/48 |
| | | | 361/63 |
| 2012/0229092 A1 | 9/2012 | Ro et al. | |
| 2013/0106320 A1 * | 5/2013 | Yugo | H02J 1/08 |
| | | | 318/139 |
| 2013/0221924 A1 * | 8/2013 | Sim | H02J 7/0063 |
| | | | 320/112 |
| 2014/0268938 A1 | 9/2014 | Matthews et al. | |
| 2015/0256079 A1 | 9/2015 | Kimura et al. | |
| 2015/0381032 A1 * | 12/2015 | Li | H02M 1/36 |
| | | | 323/271 |
| 2016/0124029 A1 | 5/2016 | Gobbi et al. | |

FOREIGN PATENT DOCUMENTS

| | | |
|---|---|---|
| CN | 104002744 A | 8/2014 |
| CN | 105730259 A | 12/2014 |
| CN | 105981278 A | 9/2016 |
| JP | 11-8935 A | 1/1999 |
| JP | 2012-147648 A | 8/2012 |
| JP | 2014-180198 A | 9/2014 |
| JP | 2015-089171 A | 5/2015 |
| JP | 2015-171289 A | 9/2015 |
| KR | 20-2009-0009362 U | 9/2009 |
| KR | 10-2012-0020704 A | 3/2012 |
| KR | 10-2014-0044127 A | 4/2014 |
| KR | 10-1657228 B1 | 9/2016 |

OTHER PUBLICATIONS

First Office Action dated Sep. 3, 2020 in Chinese patent application No. 201780085846.1, 20 pp.
Extended European Search Report dated Nov. 18, 2020 in corresponding European patent application No. 17895955.7, 8 pp.
Second Office Action dated Mar. 10, 2021 in corresponding Chinese patent application No. 201780085846.1, 17 pp.

\* cited by examiner

POWER SUPPLY AND BATTERY PACK INCLUDING SAME

CROSS-REFERENCE TO RELATED APPLICATIONS

This application is a continuation application and claims the benefit under 35 U.S.C. §§ 120 and 365 of PCT Application No. PCT/KR2017/014925, filed on Dec. 18, 2017, which is hereby incorporated by reference. PCT/KR2017/014925 also claimed priority to Korean Patent Application No. 10-2017-0017647 filed on Feb. 8, 2017, which is hereby incorporated by reference.

BACKGROUND

Field

The described technology generally relates to a power supply and a battery pack including the same.

Description of the Related Technology

A battery pack generally includes a battery and a battery management system. The battery can include a secondary battery(s) or secondary cells that can be repeatedly charged and discharged. In some battery management system, sensors are used to assess the state of the battery, such as the voltage, current, and temperature of the battery, and control the charge/discharge of the battery according to the sensed state of the battery. The battery managing unit may be driven by receiving power output by the battery. In this case, because the battery managing unit is driven with a voltage lower than the voltage of the battery, a power supply device is provided for reducing the voltage of the battery and providing a constant voltage.

The power supply device may also convert an external voltage input into a certain voltage and output the same. Also, the power supply device may include a regulator to stabilize or convert one output voltage into another output voltage.

SUMMARY OF CERTAIN INVENTIVE ASPECTS

One inventive aspect is a power supply device that can prevent occurrence of an inrush current even without including a separate configuration for reducing an inrush current when activated in response to an activation signal and a battery pack including the power supply device.

Another aspect is a power supply device that includes: a regulator reducing a voltage of input power applied to an input terminal; a sensing unit sensing an output voltage of the regulator; a reference voltage controller receiving the input power as driving power and feedback-controlling an output voltage of the regulator to correspond to a preset reference voltage, based on the sensed output voltage of the regulator; and a first switch arranged between the input terminal and the reference voltage controller to control the driving power applied to the reference voltage controller.

For example, the first switch may form a current flow independent of a current flowing in the regulator.

As another example, the first switch may be turned on to supply driving power to the reference voltage controller when an activation signal for activating the power supply device is applied thereto, and the regulator may start output of the output power in response to activation of the reference voltage controller.

As another example, the power supply device may further include a capacitor arranged between the input terminal and the regulator to remove noise included in the input power, wherein the regulator may maintain electrical connection with the capacitor even when the first switch is turned off.

As another example, the first switch may include an insulation switching element.

Another aspect is a battery pack that includes: a battery including at least one battery cell; a battery management system controlling charge and discharge of the battery; and a power supply device including a regulator reducing a voltage of the battery to supply operation power of the battery management system, a sensing unit sensing an output voltage of the regulator, a reference voltage controller receiving power of the battery as a driving voltage and controlling an output voltage of the regulator to correspond to a preset reference voltage, based on the sensed output voltage of the regulator, and a first switch controlling the driving power applied to the reference voltage controller.

For example, the first switch may form a current flow independent of a current flowing from the battery to the battery management system.

As another example, an activation signal for activating the battery management system may be applied from outside to the first switch, and the power supply device may start power supply to the battery management system when the first switch is turned on in response to the activation signal.

As another example, the power supply device may further include a capacitor removing noise included in the power of the battery, and the regulator may maintain electrical connection with the capacitor even when the first switch is turned off.

As another example, the first switch may include an insulation switching element.

Another aspect is a power supply for a battery pack, the power supply device comprising: an input terminal configured to receive input power; a regulator configured to reduce a voltage of the input power; a sensing circuit configured to sense an output voltage of the regulator; a reference voltage controller configured to receive the input power as driving power and to feedback-control the output voltage of the regulator to correspond to a preset reference voltage, based on the sensed output voltage; and a switch arranged between the input terminal and the reference voltage controller and configured to control the driving power applied to the reference voltage controller.

In the above power supply, the switch is configured to provide a current flow independent of a current flowing in the regulator. In the above power supply, the switch is configured to be turned on so as to supply the driving power to the reference voltage controller when an activation signal for activating the power supply device is applied thereto, and wherein the regulator is configured to output the reduced output voltage in response to activation of the reference voltage controller. The above power supply further comprises a capacitor arranged between the input terminal and the regulator and configured to at least partially remove noise from the input power, wherein the regulator is configured to maintain electrical connection with the capacitor even when the switch is turned off. In the above power supply, the switch comprises an insulation switching element.

In the above power supply, the regulator is configured to provide the output voltage to a battery management system configured to control charging and discharging operations of a secondary battery of the battery pack. In the above power supply, the sensing circuit is connected between the regulator and the reference voltage controller. The above power supply further comprises an output terminal configure to provide power that is different from the input power. In the above power supply, the output terminal is connected between the regulator and the sensing circuit. In the above power supply, the output terminal is connected to a battery managing circuit configured to control charging and discharging operations of a secondary battery of the battery pack. In the above power supply, the power supply does not include an inrush current limiting circuit.

Another aspect is a battery pack comprising: a battery including at least one battery cell; a battery management system (BMS) configured to control charging and discharging operations of the battery; and a power supply comprising a regulator configured to reduce a voltage of the battery to supply operation power of the BMS, a sensing circuit configured to sense an output voltage of the regulator, a reference voltage controller configured to receive power of the battery as a driving voltage and control the output voltage of the regulator to correspond to a preset reference voltage, based on the sensed output voltage, and a switch configured to control the driving power applied to the reference voltage controller.

In the above battery pack, the switch is configured to form a current flow independent of a current flowing from the battery to the BMS. In the above battery pack, the switch is configured to receive an activation signal configured to activate the BMS, and wherein the power supply is configured to provide power to the BMS when the switch is turned on in response to the activation signal. In the above battery pack, the power supply further comprises a capacitor configured to at least partially remove noise from the input power, and wherein the regulator is configured to maintain electrical connection with the capacitor even when the switch is turned off. In the above battery pack, the switch comprises an insulation switching element.

Another aspect is a battery pack comprising: a battery including at least one battery cell; a battery management system (BMS) configured to control charging and discharging operations of the battery; and a power supply configured to receive input power having a first level via an input terminal thereof, adjust the first level to a second level different from the first level, and provide power having a second level to the BMS via an output terminal thereof, wherein the power supply does not include a current limiting circuit.

In the above battery pack, the power supply comprises: a regulator electrically connected to the BMS via the output terminal and configured to reduce the first level of power to the second level of power; a sensing circuit configured to sense an output voltage of the regulator, wherein the output voltage comprises the second level of power; a reference voltage controller configured to receive power of the battery as a driving voltage and control the output voltage of the regulator to correspond to a preset reference voltage, based on the sensed output voltage; and a switch configured to control the driving power applied to the reference voltage controller.

The above battery pack further comprises a capacitor arranged between the input terminal and the regulator and configured to at least partially remove noise from the input power. In the above battery pack, the switch comprises an insulation switching element.

According to at least one of the disclosed embodiments, the power supply device and the battery pack can prevent occurrence of an inrush current even without including an additional configuration for reducing an inrush current when activated in response to an activation signal.

Also, because it is not necessary to include an additional configuration for reducing the inrush current, unnecessary power loss may be removed in the power supply device and the internal circuit configuration thereof may be simplified to reduce the total volume thereof and the manufacturing cost thereof.

DETAILED DESCRIPTION

Figure 1:
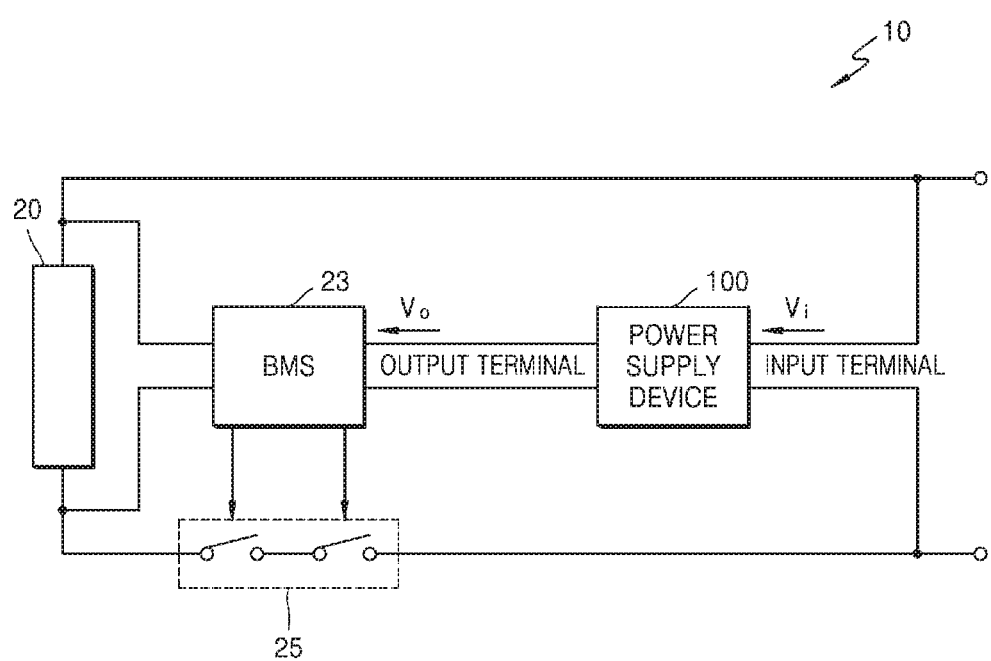
FIG. 1 is a diagram schematically illustrating an internal configuration of a battery pack according to an embodiment of the present disclosure.

A power supply device may generally include a switch at an input terminal to which an input voltage to be converted is applied. When the switch is turned off, the application of the input voltage may be blocked to deactivate the power supply device. The power supply device may have a limitation in that a large inrush current is generated by a capacitor or the like connected to the input terminal when input power is applied by turning on the switch.

The advantages and features of the present disclosure and the accomplishing methods thereof will become apparent from the following description of embodiments taken in conjunction with the accompanying drawings. However, it should be understood that the present disclosure is not limited to the embodiments described below but may be embodied in various different forms and may include all modifications, equivalents, and alternatives falling within the spirit and scope of the present disclosure. The embodiments described below are provided so that the present disclosure will be thorough and complete and will fully convey the scope of the present disclosure to those of ordinary skill in the art. In the following description of the present disclosure, certain detailed descriptions of the related art will be omitted when it is deemed that they may unnecessarily obscure the subject matters of the present disclosure.

The terminology used herein is for the purpose of describing particular embodiments only and is not intended to limit the present disclosure. As used herein, the singular forms "a", "an", and "the" are intended to include the plural forms as well, unless the context clearly indicates otherwise. It will be understood that terms such as "comprise", "include", and "have", when used herein, specify the presence of stated features, integers, steps, operations, elements, components, or combinations thereof, but do not preclude the presence or addition of one or more other features, integers, steps, operations, elements, components, or combinations thereof. Although terms such as "first" and "second" may be used herein to describe various elements or components, these elements or components should not be limited by these terms. These terms are only used to distinguish one element or component from another element or component.

Hereinafter, embodiments of the present disclosure will be described in detail with reference to the accompanying drawings, and in the following description, like reference numerals will be used to denote like elements and redundant descriptions thereof will be omitted for conciseness.

FIG. 1 is a diagram schematically illustrating an internal configuration of a battery pack 10 according to an embodiment of the present disclosure. FIG. 1 shows only some components of the battery pack 10, but various types of components may be additionally provided. Furthermore, certain elements can be removed, two or more elements combined or one element can be separated into multiple elements depending on the specification and requirements. Referring to FIG. 1, the battery pack 10 may include a battery 20 including at least one battery cell, a battery management system (BMS) (or battery management circuit) 23, a charge/discharge switch 25, and a power supply device (or power supply) 100.

The power supply device 100 may output an output voltage Vo obtained by reducing an input voltage Vi. The power supply device 100 may output a stable output voltage Vo by removing the noise of the input voltage Vi. The power supply device 100 may supply a certain constant voltage to an integrated circuit (IC), such as a microprocessor, a central processing unit (CPU), a processor core, a multiprocessor, an application-specific integrated circuit (ASIC), or a field programmable gate array (FPGA), that is sensitive to voltage variation.

The battery 20 may store power and include at least one battery cell (not illustrated). One battery cell may be included in the battery 20 or a plurality of battery cells may be included in the battery 20, and the battery cells may be connected in series, in parallel, or in series-parallel. The number of battery cells included in the battery 20 and the connection method thereof may be determined according to the desired output voltage Vo and power storage capacity.

The battery cells may include secondary batteries other than rechargeable lead storage batteries. For example, a battery cell may include a nickel-cadmium battery, a nickel metal hydride (NiMH) battery, a lithium ion battery, or a lithium polymer battery.

The charge/discharge switch 25 may be arranged on a high-current path of the battery 20 to control the flow of a charge current and a discharge current of the battery 20. The charge/discharge switch 25 may be turned on/off according to a control signal of the BMS 23. The charge/discharge switch 25 may include a relay or a field-effect transistor (FET) switch.

The BMS 23 may include any type of device that can process data, such as a processor (or processor circuit), that may acquire information about the battery 20, such as the current, voltage, and temperature of the battery 20, to analyze the state of the battery 20 and determine the need for protection of the battery 20. Here, the processor may refer to, for example, a data processing device that is embedded in hardware and has a physically structured circuit to perform a function represented by the commands or code in a program. As an example, the data processing device embedded in hardware may include any processing device such as a microprocessor, a central processing unit (CPU), a processor core, a multiprocessor, an application-specific integrated circuit (ASIC), or a field programmable gate array (FPGA); however, the present disclosure is not limited thereto.

The battery 20 may have various voltages according to at least one of serial and parallel connection methods, and the voltage of the battery 20 may vary as the battery 20 is discharged or charged. For example, when the battery 20 is discharged, the voltage of the battery 20 may decrease gradually, and when the battery 20 is charged, the voltage of the battery 20 may increase gradually. In this regard, in order to use power provided by the battery 20 as operation power, the BMS 23 may receive power from the power supply device 100 that stabilizes a voltage to supply a certain constant voltage. Meanwhile, in general, the voltage of the battery 20 may have a magnitude exceeding 5 V that is an operation voltage of the BMS 23.

The power supply device 100 may output a preset reference voltage regardless of variations in the voltage of the battery 20. The power supply device 100 may include a regulator and output a certain constant voltage through the regulator. The preset reference voltage may be set by considering a rated voltage required by the BMS 23. For example, when the preset reference voltage is 5 V, the power supply device 100 may be controlled to output a constant voltage of 5 V even when the voltage of the battery 20 increases or decreases.

According to an embodiment, the BMS 23 may receive a constant voltage, which is a preset reference voltage, from the power supply device 100, sense information such as the current, voltage, and temperature of the battery 20, and obtain information such as residual power, lifetime, or state of charge (SOC) based on the sensed information. For example, the BMS 23 may measure the cell voltage and temperature of the battery cell of the battery 20 by using sensors.

Figure 2:
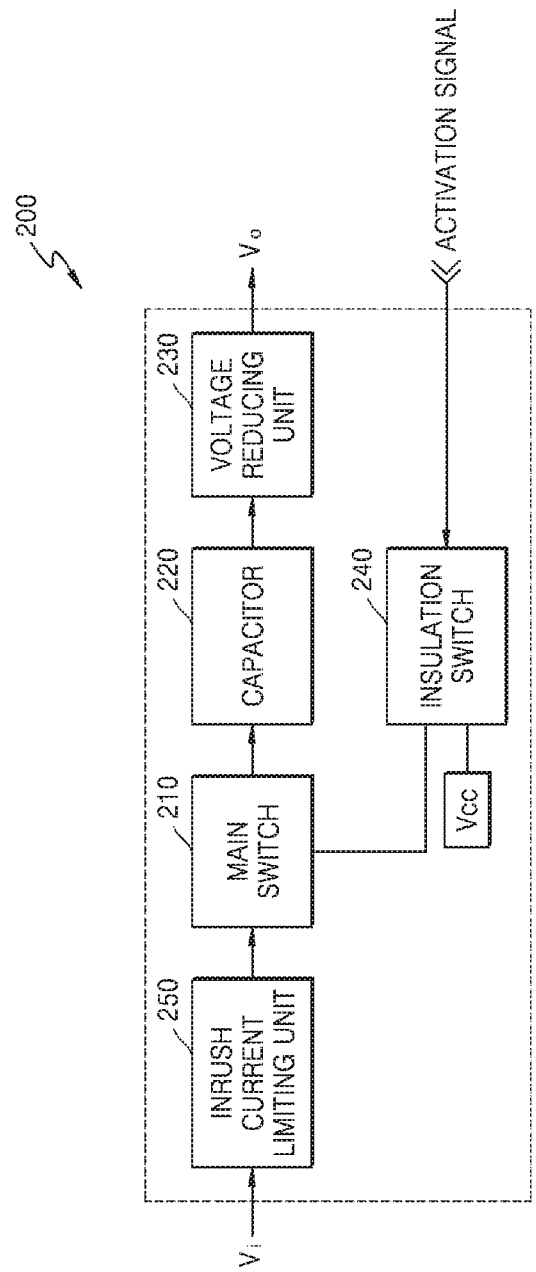
FIG. 2 schematically illustrates an internal configuration of a power supply device.

FIG. 2 schematically illustrates an internal configuration of a power supply device 200 where an input voltage is controlled.

Referring to FIG. 2, the power supply device 200 may include an inrush current limiting unit (or inrush current limiting circuit) 250, a main switch 210, a capacitor 220, a voltage reducing unit (or voltage reducing circuit) 230, and an insulation switch 240.

The voltage reducing unit 230 may reduce the magnitude of an input voltage applied to the main switch 210. The voltage reducing unit 230 may reduce the magnitude of the input voltage down to a voltage required to operate a load (not illustrated) connected to an output terminal. In order to make a constant-voltage output, the voltage reducing unit 230 may include at least one of a linear regulator for operating an element in an active region to reduce an input voltage and a switching regulator for reducing a voltage according to repetition of turning on/off a switch according to a pulse width modulation signal.

In some embodiments, the power supply device 200 may block electrical connection between the voltage reducing unit 230 and an input terminal to which input power is applied, to stop power supply to the load connected to the output terminal. Thereafter, when an external control device for controlling activation and deactivation of the power supply device 200 applies an activation signal thereto, the power supply device 200 may resume the connection between the input terminal and the voltage reducing unit 230 to resume the power supply to the load.

The main switch 210 may be arranged between the input terminal and the voltage reducing unit 230. The external control device may control the electrical connection between the input terminal and the voltage reducing unit 230 by applying a control signal to the main switch 210. For example, the power supply device 200 may be connected to the battery 20 at the input terminal thereof to receive input power from the battery 20, and the BMS 23 may be connected to the output terminal thereof to supply an output voltage Vo, which is obtained by reducing a voltage Vi of the input power, as operation power of the BMS 23.

As described with reference to FIG. 1, the input voltage Vi may have a higher level than the output voltage Vo. Because the input voltage Vi is applied to the main switch 210, it may be necessary to insulate the external control device from the input voltage Vi. For this, the main switch 210 may include the insulation switch 240; however, because the main switch 210 should supply power to the load connected to the output terminal, a relatively high input current may flow therethrough. For example, when an average current supplied to the load is 20 A, the cost of an insulation switch having a rating above the average current may be considerably higher than the cost of an insulation switch below 1 A. Considering the problem of such a cost increase, as illustrated in FIG. 2, a two-stage switch in which the main switch 210 is controlled and the insulation switch 240 having a low rated current is further arranged may be included to secure the insulation from the external control device. In this case, it may be necessary to further include a voltage source Vcc for applying separate power to the insulation switch 240, and thus, the volume of the power supply device 200 may increase.

The capacitor 220 may remove the noise in the voltage of the battery 20 to provide a stabilized voltage to the voltage reducing unit 230. Also, the capacitor 220 may stabilize the oscillation of the input/output according to the feedback control of the voltage reducing unit 230. The capacitor 220 may be charged up to a voltage corresponding to the voltage of the input power when the main switch 210 is turned on.

Meanwhile, the capacitor 220 may allow a large current to flow therethrough at the time when the main switch 210 is turned on. The capacitor 220 may have a voltage of 0 V thereacross (i.e., between both ends thereof) at the time when the main switch 210 is turned on. After the main switch 210 is turned on, a considerably large current of a magnitude obtained by dividing the voltage Vi of the input power by the internal resistance element between the input terminal and the capacitor 220 may be applied to the capacitor 220. A considerably large current flowing at the time when the main switch 210 is turned on may be defined as an inrush current, and the inrush current may decrease gradually with time. For example, when the main switch 210 is turned on, 37.8 V may be applied to the capacitor 220, and when the sum of internal resistances due to conductors or the like is 150 mΩ, the magnitude of an initial inrush current applied to the capacitor 220 at the time of starting to charge the capacitor 220 may be about 252 A that is equal to 37.8/0.15. This inrush current may damage the internal elements of the power supply device 200 and other devices electrically connected to the power supply device 200.

In general, the power supply device 200 may further include an inrush current limiting unit 250 including a resistance element or the like that may limit the inrush current of the capacitor 110. In this case, the inrush current limiting unit 250 may reduce the inrush current at the time when the main switch 210 is turned on; however, even when the problem of the inrush current is removed, unnecessary power consumption may occur due to the resistance element or the like included in the inrush current limiting unit 250 and thus the efficiency of the power supply device 200 may be greatly reduced.

That is, as for the power supply device 200 illustrated in FIG. 2, unnecessary power consumption may increase due to the inrush current limiting unit 250, and the volume and cost thereof may increase greatly. Unlike this, the power supply device 100 according to an embodiment of the present disclosure may not cause an inrush current at the time of activation and thus may not require a circuit configuration such as a resistance element for limiting the inrush current, which will be described below in detail with reference to FIG. 3.

Figure 3:
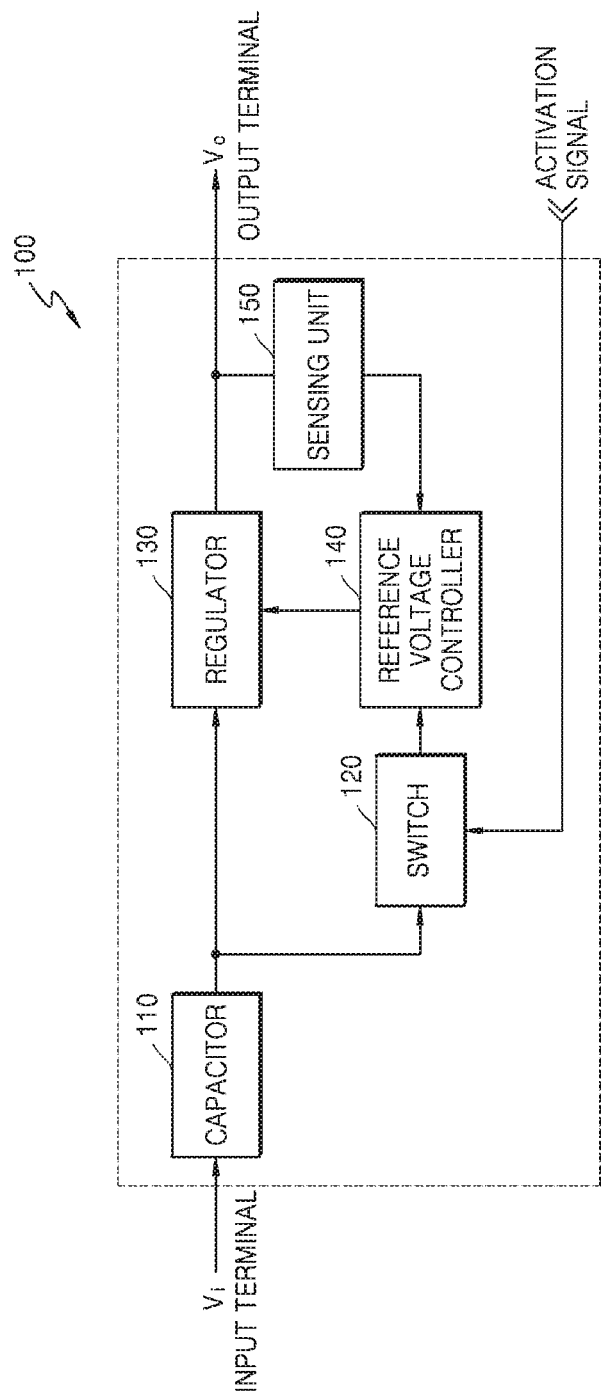
FIG. 3 schematically illustrates an internal configuration of a power supply device according to an embodiment of the present disclosure.

FIG. 3 schematically illustrates an internal configuration of a power supply device according to an embodiment of the present disclosure.

Referring to FIG. 3, the power supply device 100 may include a capacitor 110, a first switch (or switch) 120, a regulator 130, a reference voltage controller 140, and a sensing unit (or sensing circuit) 150.

The power supply device 100 may receive input power from an input terminal, reduce the voltage of the input power, and supply power to a load. For example, when the power of the battery 20 is supplied as the input power and the BMS 23 is connected to an output terminal, the power supply device 100 may reduce a voltage Vi of the input power supplied by the battery 20 and supply the same to the BMS 23. For example, when the voltage of the battery 20 is 50 V and the BMS 23 operates with a voltage of 5 V, the BMS 23 may not directly use the voltage of the battery 20 as operation power and thus may require the power supply device 100. In this case, the power supply device 100 may reduce a voltage of 50 V, which is the voltage of the battery 20 applied to the input terminal, to a voltage of 5 V and output the same to the BMS 23.

The regulator 130 may reduce an input voltage Vi that is a voltage applied to an input terminal, like the voltage reducing unit 230 described with reference to FIG. 2. In order to make a constant-voltage output, the regulator 130 may include at least one of a linear regulator for operating an element in an active region to reduce an input voltage Vi and a switching regulator for reducing a voltage according to repetition of turning on/off a switch according to a pulse width modulation signal.

The sensing unit 150 may sense an output voltage Vo of the regulator 130. The sensing unit 150 may provide information about the sensed output voltage Vo to the reference voltage controller 140.

As illustrated in FIG. 3, the power supply device 100 may include a first path for providing a current flow from the input terminal to the output terminal and a second path for providing a current flow from the input terminal to the reference voltage controller 140. The power supply device 100 may supply power to the load connected to the output terminal through the first path and supply power to the reference voltage controller 140 through the second path. The first path may be a path through which the current supplied to the load flows, and a current considerably larger than the current flowing through the second path may flow through the first path.

The first switch 120 may be arranged between the capacitor 110 and the reference voltage controller 140. Unlike the main switch 210 illustrated in FIG. 2, the first switch 120 may control the current flow of the second path rather than the current flow of the first path. The turn-on/turn-off of the first switch 120 may not affect the current flow of the first path. That is, the first path and the second path may provide paths through which currents independent of each other flow. When the first switch 120 is turned off and thus the second path is blocked, the operation power supplied to the reference voltage controller 140 may be blocked. In this case, the reference voltage controller 140 may be deactivated, and the regulator 130 may be deactivated for failing to receive a control signal from the reference voltage controller 140. That is, the power supply device 100 may be deactivated by turning off the first switch 120; however, the power supply device 100 may be deactivated by blocking the operation power of the reference voltage controller 140 without directly blocking the current flow between the input terminal and the output terminal like the main switch 210 described with reference to reference to FIG. 2.

The first switch 120 may include an insulation switching element, for example, a photocoupler, to protect the external control device described with reference to FIG. 2 from a high voltage applied to the input terminal. Unlike the main switch 210 described with reference to FIG. 2, because the first switch 120 is arranged in the second path through which a considerably lower current flows than through the second path through which a current for supplying power to the load flows, not a two-stage structure of the main switch 210 and the insulation switch 240 described with reference to FIG. 2 but the first switch 120 corresponding to the insulation switch 240 may be directly arranged on the second path. Accordingly, the power supply device 100 may be activated by receiving an activation signal in a state of being insulated with a simplified circuit configuration.

The reference voltage controller 140 may operate by receiving the input power applied to the input terminal as driving power that is power for operation. The driving power may be controlled through the first switch 120, and when the first switch 120 is turned off, the reference voltage controller 140 may be deactivated. The reference voltage controller 140 may output a control signal for controlling the magnitude of a voltage of output power Vo of the regulator 130. The reference voltage controller 140 may feedback-control the magnitude of the control signal based on the difference between a preset reference voltage and an output voltage Vo sensed by the sensing unit 150. That is, the reference voltage controller 140 may modify the control signal for controlling the output voltage Vo until the output voltage Vo of the regulator 130 is equal to the preset reference voltage. The preset reference voltage may be set by considering the operation power of the load. For example, when the load supplied with the output power of the power supply device 100 operates with a voltage of 7 V, the preset reference voltage may be set to 7 V.

For example, when the regulator 130 includes a linear regulator, the linear regulator may include at least one of a bipolar transistor and a field-effect transistor. In this case, the reference voltage controller 140 may control the magnitude of the output voltage Vo of the regulator 130 by controlling the magnitude of a voltage applied to a control electrode of the bipolar transistor or the field-effect transistor. That is, the reference voltage controller 140 may perform feedback control for modifying the magnitude of the voltage applied to the control electrode until the output voltage Vo of the regulator 130 is equal to the preset reference voltage.

According to an embodiment, the first switch 120 may be turned on by receiving an activation signal from the external control device. When the first switch 120 is turned on, the reference voltage controller 140 may receive the driving power and output a control signal for controlling the regulator 130. When a control signal of the reference voltage controller 140 is applied thereto, the regulator 130 may output and supply power to the BMS 23 according to the control signal. That is, the external control device may control activation and deactivation of the power supply device 100 by applying an activation signal to the first switch 120 or by turning off the first switch 120.

According to an embodiment, at the time when the power supply device 100 is activated according to the activation signal, because the capacitor 110 is already charged up to the voltage Vi of the input power, it may be possible to limit or prevent the occurrence of an inrush current occurring at the beginning of operation due to the difference between the voltage Vi of the input power and the voltage across the capacitor (i.e., the voltage between both ends of the capacitor). Even while the first switch 120 is turned off, the capacitor 110 may maintain electrical connection with the input terminal. In other words, even when the first switch 120 is turned off, the capacitor 110 may maintain electrical connection with the input terminal and thus may maintain a state of being charged up to a voltage corresponding to the input voltage Vi. In this case, when the first switch 120 is turned on, because there is almost no difference between the voltage across the capacitor 110 and the voltage of the input terminal, a considerably large current may not be applied, like the inrush current described with reference to FIG. 2.

The power supply device 100 may remove (not include) the main switch 210 described with reference to FIG. 2 and the inrush current limiting unit 250 including resistance and protection elements for protection against an inrush current. Accordingly, the power supply device 100 may reduce the number of components included therein, thus reducing the volume thereof and significantly reducing the manufacturing cost thereof. Also, unnecessary power consumption due to the resistance element included in the inrush current limiting unit 250 may be removed, and the internal circuit configuration may be designed without the fear of damage to the internal configuration due to an inrush current.

Figure 4:
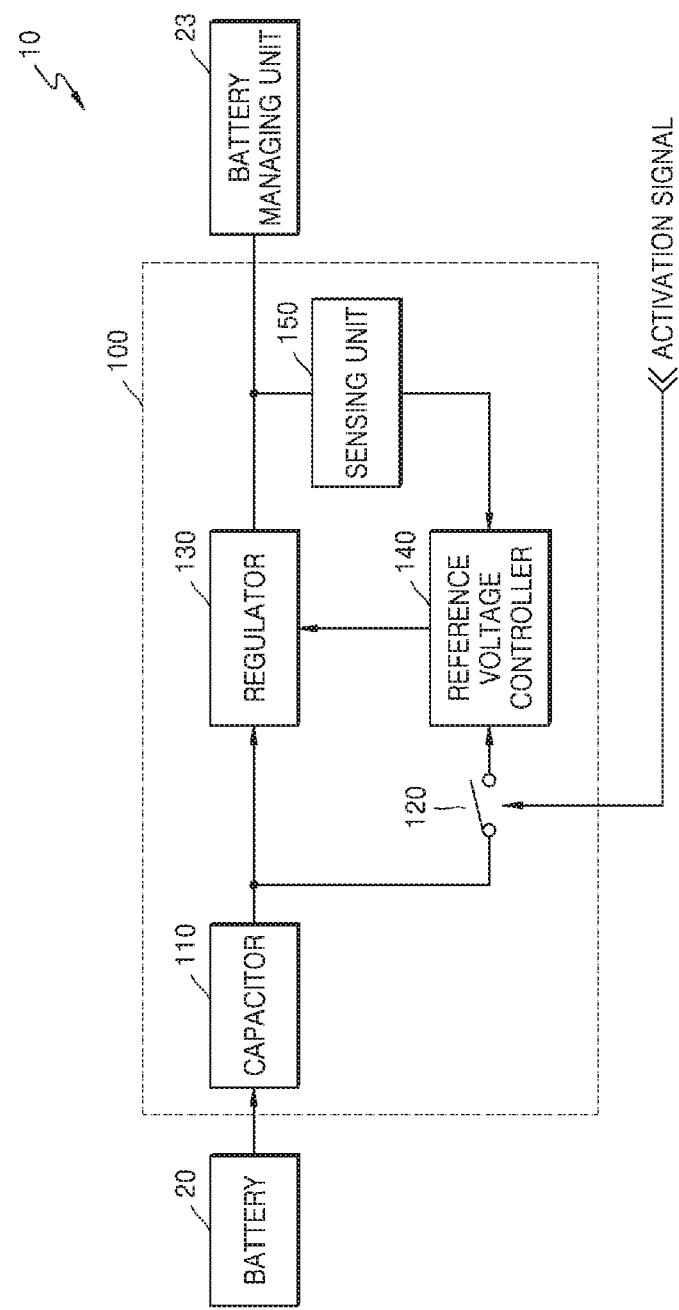
FIG. 4 is a diagram schematically illustrating an internal configuration of a battery pack according to an embodiment of the present disclosure.

FIG. 4 is a diagram schematically illustrating an internal configuration of a battery pack according to an embodiment of the present disclosure.

Referring to FIG. 4, the power supply device 100 may receive power supplied by the battery 20 and supply the BMS 23 with output power Vo obtained by reducing the voltage of the received input power.

The power supply device 100 may include a capacitor 110 for removing the noise in the input power and stabilizing the input power, a regulator 130 for reducing the voltage Vi of the input power, a reference voltage controller 140 for controlling the output voltage Vo of the regulator 130 to have a value corresponding to a preset reference voltage, and a first switch 120 for controlling the operation power of the reference voltage controller 140.

The power supply device 100 may receive the input power from the battery 20, reduce the voltage Vi of the input power, and supply the same as the operation power of the BMS 23. When the first switch 120 is turned on, the power supply device 100 may be activated to start supplying the operation power of the BMS 23, and when the first switch 120 is turned off, the power supply device 100 may be deactivated to shut down the BMS 23.

According to an embodiment, when the power supply device 100 receives an activation signal, the power supply device 100 may supply power to the BMS 23 to activate the BMS 23. The activation signal may be applied by the external control device of the battery pack 10 to activate the BMS 23. When the activation signal is applied thereto, the first switch 120 may be turned on to supply power to the reference voltage controller 140. When activated by receiving power supply, the reference voltage controller 140 may apply a control signal to the regulator 130 such that the regulator 130 may supply power to the BMS 23. The BMS 23 may be activated by receiving the output power Vo of the regulator 130 obtained by reducing the voltage of the input power, and may start to analyze the state of the battery 20 by sensing the voltage, current, and temperature of the battery 20.

According to an embodiment, the capacitor 110 may maintain electrical connection with the battery 20 regardless of turning on/off the first switch 120. When the first switch 120 is turned on by receiving an activation signal, because the capacitor 110 is charged with a voltage corresponding to the voltage of the input power that is not 0 V, a large inrush current may not occur due to the difference between the voltage across the capacitor 110 and the voltage of the input power. Thus, the power supply device 100 may be safely activated even without including the inrush current limiting unit 250 for limiting the magnitude of an inrush current.

The present disclosure has been particularly shown and described with reference to example embodiments thereof. However, those of ordinary skill in the art will understand that various changes in form and details may be made therein without departing from the spirit and scope of the present disclosure as defined by the following claims. Therefore, the described embodiments should be considered in descriptive sense only and not for purposes of limitation. Thus, the scope of the present disclosure may be defined not by the above detailed descriptions but by the following claims, and all differences within the equivalent scope will be construed as being included in the present disclosure.

What is claimed is:

1. A power supply for a battery pack, the power supply device comprising:
    an input terminal configured to receive input power;
    an output terminal configured to provide power that is different from the input power;
    a regulator configured to reduce a voltage of the input power;
    a sensing circuit configured to sense an output voltage of the regulator;
    a reference voltage controller configured to receive the input power as driving power and to feedback-control the output voltage of the regulator to correspond to a preset reference voltage, based on the sensed output voltage;
    a switch arranged between the input terminal and the reference voltage controller
    and configured to control the driving power applied to the reference voltage controller; and
    a capacitor arranged between the input terminal and the regulator, wherein the capacitor is further arranged between the input terminal and the switch,
    wherein the sensing circuit is directly connected to the regulator,
    wherein the output terminal is connected to the regulator and the sensing circuit, wherein the input terminal, the capacitor, the regulator, and the output terminal form a first current path through which a first level of current flows, wherein the input terminal, the capacitor, the switch, and the reference voltage controller form a second current path through which a second level of current flows, the second level of current being less than the first level of current, and wherein the first current path is independent of the second current path,
    wherein the switch is configured to receive an activation signal configured to activate a battery management system (BMS), wherein the power supply is configured to provide power to the BMS when the switch is turned on in response to the activation signal, and
    wherein the power supply is configured to be deactivated to shut down the BMS when the switch is turned from on to off.

2. The power supply of claim 1, wherein the switch is configured to be turned on so as to supply the driving power to the reference voltage controller when the activation signal for activating the power supply device is applied thereto, and
    wherein the regulator is configured to output the reduced output voltage in response to activation of the reference voltage controller.

3. The power supply of claim 1, further and wherein the capacitor is configured to at least partially remove noise from the input power, and wherein the regulator is configured to maintain electrical connection with the capacitor even when the switch is turned off.

4. The power supply of claim 1, wherein the switch comprises an insulation switching element.

5. The power supply of claim 1, wherein the regulator is configured to provide the output voltage to a battery management system configured to control charging and discharging operations of a secondary battery of the battery pack.

6. The power supply of claim 1, wherein the output terminal is connected between the regulator and the sensing circuit.

7. The power supply of claim 1, wherein the output terminal is connected to a battery managing circuit configured to control charging and discharging operations of a secondary battery of the battery pack.

8. A battery pack comprising:
    a battery including at least one battery cell;
    a battery management system (BMS) configured to control charging and discharging operations of the battery; and
    a power supply comprising:
    an input terminal configured to receive input power,
    an output terminal configured to provide power that is different from the input power,
    a regulator configured to reduce a voltage of the battery to supply operation power of the BMS,
    a sensing circuit configured to sense an output voltage of the regulator,
    a reference voltage controller configured to receive power of the battery as a driving voltage and control the output voltage of the regulator to correspond to a preset reference voltage, based on the sensed output voltage, and
    a switch configured to control the driving power applied to the reference voltage controller, wherein the sensing circuit is directly connected to the regulator, and
    a capacitor arranged between the input terminal and the regulator, wherein the capacitor is further arranged between the input terminal and the switch,
    wherein the output terminal is connected to the regulator and the sensing circuit, wherein the input terminal, the capacitor, the regulator, and the output terminal form a first current path through which a first level of current flows, wherein the input terminal, the capacitor, the switch, and the reference voltage controller form a second current path through which a second level of current flows, the second level of current being less than the first level of current, and wherein the first current path is independent of the second current path,
    wherein the switch is configured to receive an activation signal configured to activate the BMS, wherein the power supply is configured to provide power to the BMS when the switch is turned on in response to the activation signal, wherein the power supply is configured to be deactivated to shut down the BMS when the switch is turned from on to off.

9. The battery pack of claim 8, wherein the capacitor is configured to at least partially remove noise from the input power, and wherein the regulator is configured to maintain electrical connection with the capacitor even when the switch is turned off.

10. The battery pack of claim 8, wherein the switch comprises an insulation switching element.

11. A battery pack comprising:
a battery including at least one battery cell;
a battery management system (BMS) configured to control charging and discharging operations of the battery; and
a power supply configured to receive input power having a first level via an input terminal thereof, adjust the first level to a second level different from the first level, and provide power having a second level to the BMS via an output terminal thereof,
wherein the power supply comprises:
a regulator electrically connected to the BMS via the output terminal and configured to reduce the first level of power to the second level of power;
a sensing circuit configured to sense an output voltage of the regulator, wherein the output voltage comprises the second level of power;
a reference voltage controller configured to receive power of the battery as a driving voltage and control the output voltage of the regulator to correspond to a preset reference voltage, based on the sensed output voltage; and
a switch configured to control the driving power applied to the reference voltage controller; and
a capacitor arranged between the input terminal and the regulator, wherein the capacitor is further arranged between the input terminal and the switch,
wherein the sensing circuit is directly connected to the regulator,
wherein the output terminal is connected to the regulator and the sensing circuit, wherein the input terminal, the capacitor, the regulator, and the output terminal form a first current path through which a first level of current flows, wherein the input terminal, the capacitor, the switch, and the reference voltage controller form a second current path through which a second level of current flows, the second level of current being less than the first level of current, and wherein the first current path is independent of the second current path,
wherein the switch is configured to receive an activation signal configured to activate the BMS, wherein the power supply is configured to provide power to the BMS when the switch is turned on in response to the activation signal, and
wherein the power supply is configured to be deactivated to shut down the BMS when the switch is turned from on to off.

12. The battery pack of claim 11, wherein the capacitor is configured to at least partially remove noise from the input power.

13. The battery pack of claim 11, wherein the switch comprises an insulation switching element.

14. The power supply of claim 1, wherein the sensing circuit is further directly connected to the reference voltage controller.

15. The power supply of claim 1, wherein the switch is configured to deactivate the power supply by blocking the driving power of the reference voltage controller without directly blocking the first current path between the input terminal and the output terminal.

16. The power supply of claim 1, wherein the capacitor is directly connected to the switch and the regulator.

* * * * *